United States Patent [19]

Beaulieu

[11] Patent Number: 4,941,717
[45] Date of Patent: Jul. 17, 1990

[54] KNOCKDOWN TABLE AND CABINET STRUCTURE

[75] Inventor: Bryan J. Beaulieu, Burnsville, Minn.

[73] Assignee: Skyline Displays, Inc., Burnsville, Minn.

[21] Appl. No.: 419,382

[22] Filed: Oct. 10, 1989

[51] Int. Cl.⁵ .............................................. A47B 48/00
[52] U.S. Cl. ............................. 312/265.3; 312/265.4; 403/252; 403/263
[58] Field of Search ................ 108/111; 403/252, 254, 403/263; 312/265, 265.1–265.4, 140

[56] References Cited

U.S. PATENT DOCUMENTS

| | | | |
|---|---|---|---|
| 2,926,941 | 3/1957 | Thompson . | |
| 3,415,554 | 12/1968 | Papayoti . | |
| 3,601,347 | 8/1971 | Attwood et al. . | |
| 3,797,948 | 3/1974 | Weininger . | |
| 3,837,754 | 9/1974 | Malcik | 403/263 X |
| 3,938,900 | 2/1976 | Apple | 403/263 |
| 4,706,573 | 11/1987 | Sielaff | 312/265 |
| 4,771,908 | 9/1988 | McIntosh | 312/265.5 |

FOREIGN PATENT DOCUMENTS 444424  1/1974  Australia .

2506615  8/1975  Fed. Rep. of Germany ... 312/265.4

Primary Examiner—Joseph Falk
Attorney, Agent, or Firm—Paul L. Sjoquist

[57] ABSTRACT

A lightweight knockdown table and cabinet structure adapted for ease of assembly and disassembly comprised of a plurality of hollow tubular frame members releasably interconnected by a plurality of fasteners and lock assemblies and having a multi-sectioned top which adds rigidity and support to the structure. The fastener and lock assemblies each include a fastening device with multiple end connectors. The fastening devices are slidably insertable into the frame members and have a guide slot bridging into a locking slot. The end connectors are also insertable into the frame members and have a projecting male connector end. The male connector end is insertable into the guide slot and movable into locking engagement within the locking slot to releasably interlock the frame members together at right angles. The multi-sectioned top includes adjacent middle and side sections with support flanges which rest upon opposing frame members. The side sections each have an outwardly extending re-enforcement lip which lies under the adjacent frame member to add rigidity and support to the structure.

13 Claims, 6 Drawing Sheets

KNOCKDOWN TABLE AND CABINET STRUCTURE

BACKGROUND OF THE INVENTION

This invention relates to a lightweight knockdown table and cabinet structure including a novel fastener and lock assembly for quick and easy set up or knockdown of the structure and a multi-sectioned top which adds strength and rigidity to the overall structure which is capable of supporting considerable weight.

Table and cabinet structures are very useful for presentations and trade shows for supporting various items as well as for storing or concealing things that a user does not wish others to readily see, such as supplies, containers, briefcases, and miscellaneous other things Conventional tables and cabinets are unfortunately heavy, bulky and not easily transportable for use at trade shows and the like.

Collapsible self-supporting structures are known and typically have a network of support rods which are pivotally joined together by hub assemblies for movement between a collapsed, compact position for storage or transportation, and an open or erect condition in which the desired structural shape is attained as disclosed in co-owned U.S. Pat. No. 4,627,210 Dome or arch-shaped structures of this type may be illustrated by U.S Pat. Nos. 3,838,703; 3,968,808; 4,026,313; and 4,290,244.

Collapsible display panel or wall structures of the type having planar or arcuate faced surfaces may be illustrated by U.S. Pat. Nos. 4,276,726 and 4,471,548. Such panel structures are commercially available and are useful for trade shows and the like. These types of structures are typically covered by a sheet of material for either covering the front of the panel structure or displaying a graphic representation.

Collapsible, self-supporting structures with various attachments and fastening assemblies are also known and illustrated by co-owned U.S. Pat. No. 4,658,560. However, such structures with fastening and connecting assemblies do not themselves for adaption for knockdown table and cabinet structures.

There is need for a lightweight but rigid and strong knockdown table and cabinet structure that will simply and readily assemble and disassemble without the need for tools or time-consuming effort and which will readily fold up or knockdown for easy transportation.

SUMMARY OF THE INVENTION

A lightweight knockdown table and cabinet structure adapted for ease of assembly and disassembly comprised of a plurality of hollow tubular frame members releasably interconnected by a plurality of fasteners and lock assemblies and having a multi-sectioned top which adds rigidity and support to the structure. The fastener and lock assemblies each include a fastening device with multiple end connectors The fastening devices are slidably insertable into the frame members and have a guide slot bridging into a locking slot. The end connectors are also insertable into the frame members and have a projecting male connector end. The male connector end is insertable into the guide slot and movable into locking engagement within the locking slot to releasably interlock the frame members together at right angles The multi-sectioned top includes adjacent middle and side sections with support flanges which rest upon opposing frame members The side sections each have an outwardly extending re-enforcement lip which lies under the adjacent frame member to add rigidity and support to the structure.

A principal object and advantage of this invention is that the tubular frame members are preferably made of extruded plastic material which enables the overall structure to be very light while being rigid, strong and capable of supporting considerable weight due to a unique fastener and lock assembly in combination with the multi-sectioned top having reinforcement lips which further rigidify the structure.

Another advantage and object of this invention is that the structure permits quick and easy assembly and disassembly without the need for any hand tools Furthermore, after some nominal factory pre-assembly, the fastener and lock assembly parts or elements are connected to the frame members and not subject to being lost.

Still another object and advantage of the present invention is that the modular elements permit building of table and cabinet support structures of almost any size with readily interchangeable elements or parts which are also easily replaceable when the parts become damaged or broken.

BRIEF DESCRIPTION OF THE DRAWINGS

fastening devices.

and a leveling threaded foot.

DETAILED SPECIFICATION

Figure 1:
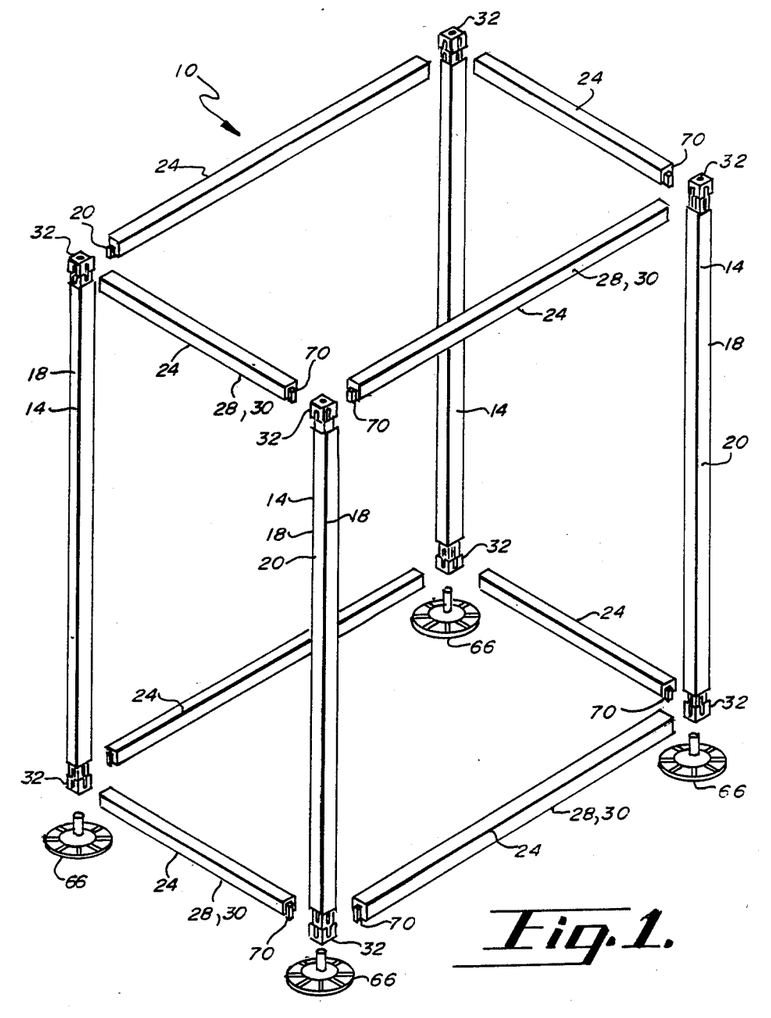
FIG. 1 is a perspective view of the table and cabinet structure without the fastening devices and end connectors in interlockingly engaged.
Figure 2:
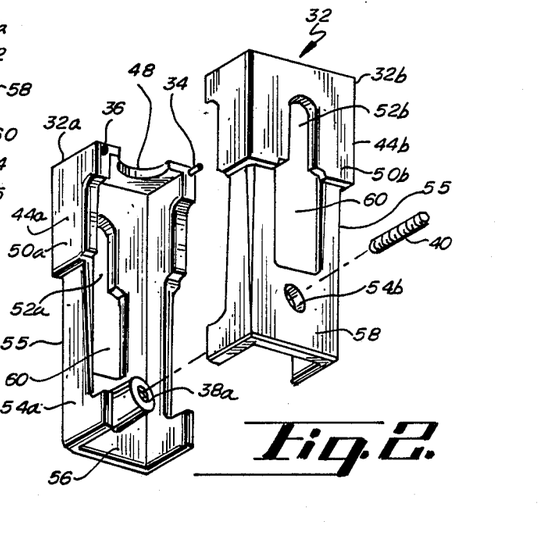
FIG. 2 is a perspective view of one of the fastening devices prior to its assembly.
Figures 3, 4:
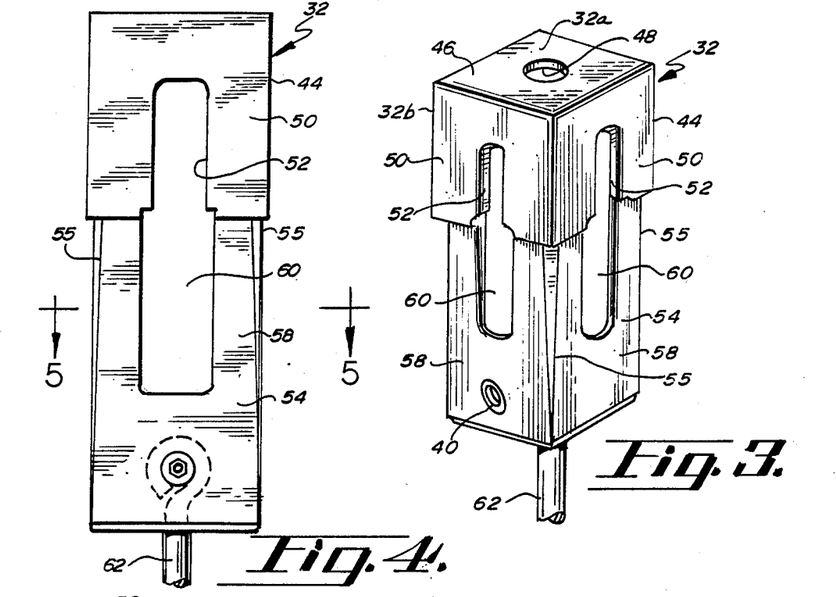
FIG. 3 is a perspective view of one of the assembled fastening devices.
FIG. 4 is a side elevational view of a fastening device.
Figure 5:
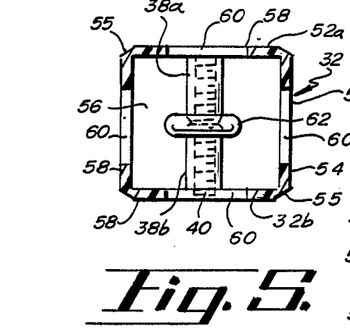
FIG. 5 is a cross-sectional view of the fastening device taken along lines 5—5 of FIG. 4.
Figures 6, 7, 12, 13:
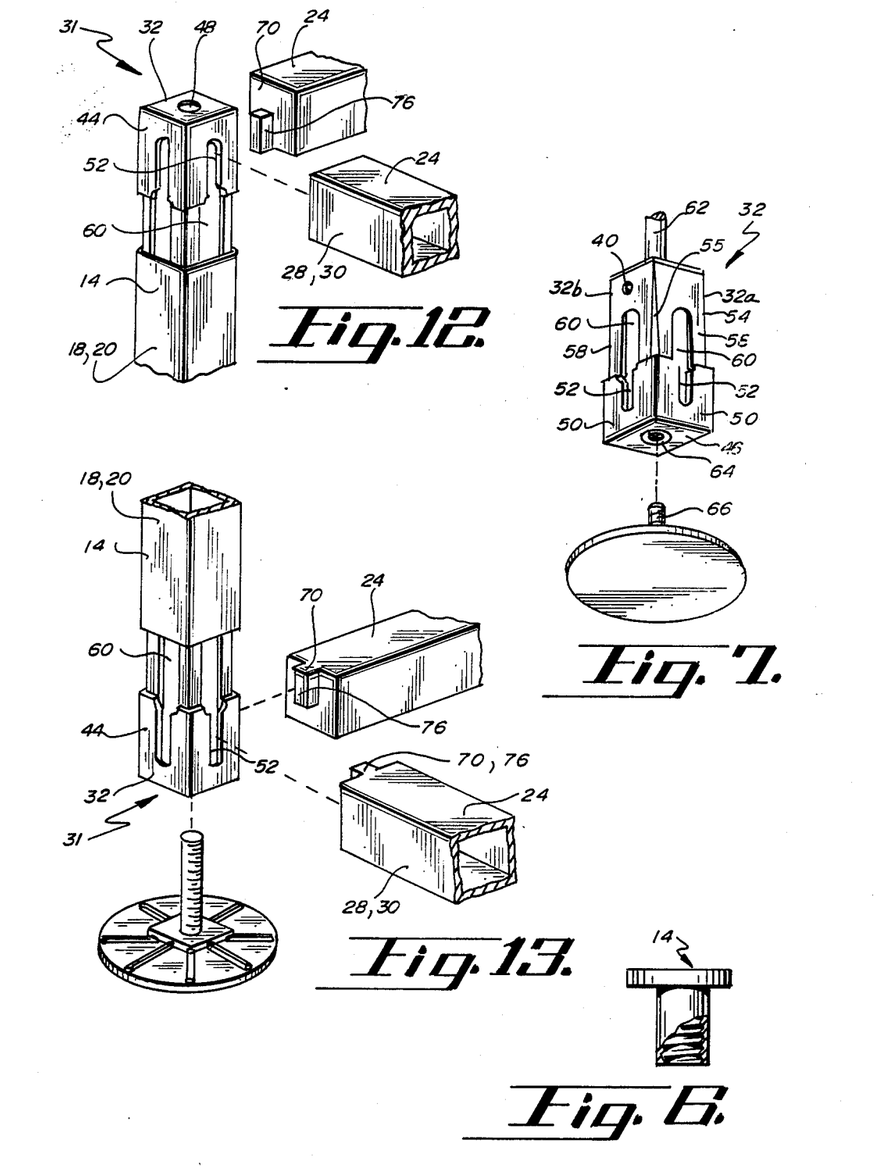
FIG. 6 is a side elevational view of a fastening insert partially broken away to be press fit into an end face of one of the fastening devices.
FIG. 7 exploded perspective view of a fastening device and a leveling threaded foot.
FIG. 12 is a detail view of a lower fastener and lock assembly with frame members taken from FIG. 1.
FIG. 13 is an enlarged detail view of an upper fastener and lock assembly with frame members also taken from FIG. 1.
Figure 19:
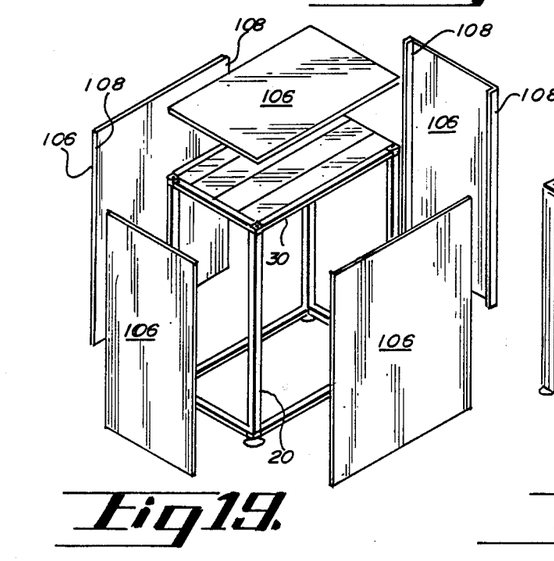
FIG. 19 is a perspective view of the assembled table and cabinet structure with the flexible cabinet panels exploded away from the structure.

Referring first to FIGS. 1 and 19, the knockdown table and cabinet structure 10 of the present invention generally includes vertical frame members 14 and horizontal frame members 24. The fastener and lock assemblies 31 each include a fastening device 32 and multiple end connectors 70 both of which are slidably insertable within the ends of the respective frame members 14 and 24. Threaded feet 66 are provided for leveling the table and cabinet structure 10. The multi-sectioned top 86 generally includes at least one middle section 88 and two side sections 96 The side sections 96 each have an outwardly extending, horizontal frame member reinforcement lip 104. Flexible cabinet panels 106 are provided to enclose the structure 10 by means of magnetic tape strips 20, 30 and 108.

Vertical frame members 14 are suitably made of lightweight extruded plastic tubing which is appropriately square in cross-section Forty-five degree fillets 16 are on the inside corners of the ends of the frame members 14 which facilitate slidable insertion of the fastening devices 32 therein. Frame members 14 have outward faces 18 with magnetic means or magnetic tape strips 20 appropriately affixed thereon.

Horizontal frame members 24 similarly are made of lightweight extruded plastic tubing square in cross-section having 45° fillets 26 on their inside corners. The outward faces 28 of the horizontal frame members 24 also have magnetic tape strips 30 for releasably holding the flexible cabinet panels 106 in cooperation with the magnetic strips 20 of vertical frame members 14 and the magnetic strips 108 of the cabinet panels 106.

Referring to FIGS. 2–7, the detailed construction and assembly of fastening devices 32 may more particularly be seen. Fastening devices 32 are appropriately made of a die-cast metal to enable manufacturing to precise specifications and to provide for consistent close fitting within vertical frame members 14 and interlocking with end connectors 70. Fastening devices 32 are comprised of mirror-image halves 32a and 32b each of which have a tapered pin 34 which projects from an inner corner and a tapered recess at the opposite inner corner. The pins 34 and recesses 36 are oppositely aligned with respect to mirror image halves 32a and 32b and are also sized for interference or frictional fitting when the mirror halves 32a and 32b are compressed together thereby forming a unified single fitting or fastening device 32. Inner threaded pedestals 38a and 38b, each with a threaded aperture therein, are located inwardly on mirror image halves 32a and 32b, respectively. Set screw 40 may be threaded between the pedestals 38a and 38b to further interlock the mirror-image halves 32a and 32b into a unified fastening device 32.

The fastening devices 32 each have an extending section 44 and a slidably insertable end or section 54. The extending section 44 has an end face 46 with an aperture 48 centrally located therein. Four side faces 50 are also provided each preferably having a narrow elongate locking slot or opening 52 vertically oriented therein. The slidably insertable end 54 is of a lesser outer dimension than the extending section 44 and has longitudinal chamfers 55 located along its edges to facilitate slidable insertion into vertical frame members 14 in cooperation with fillets 16. Slidable insertable end 54 also has an open end 56 and four side faces 58 each with a wide elongate guide slot 60 vertically oriented therein which bridges into the adjacent narrow locking slot 52 of the extending section 44. An elastic cord 62, suitably of the "bunge" type, is appropriately fastened about pedestals 38a and 38b with its end extending through open end 56 of the fastening device 32. Threaded insert 64 is press fit into the aperture 48 of the end face 46 suitably for rotatably accepting the threaded foot 66 which by this arrangement makes threaded foot 66 adjustable to level the table or cabinet 10 on any floor surface.

Figure 8:
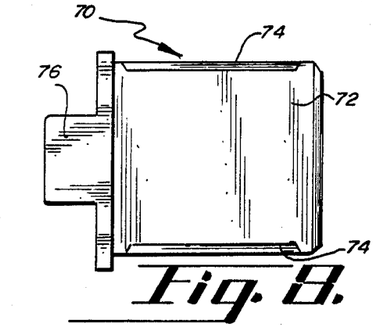
FIG. 8 is a top view of an end connector.
Figure 9:
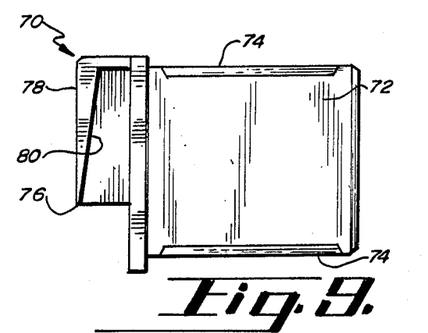
FIG. 9 is a side elevational view of an end connector.
Figure 10:
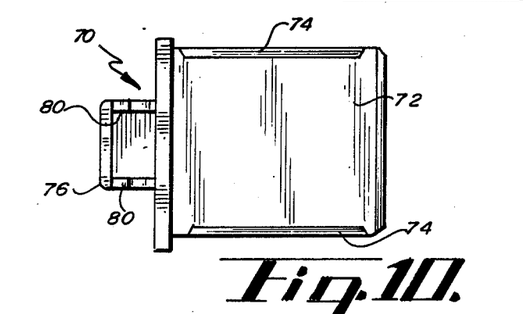
FIG. 10 is a bottom view of an end connector.
Figure 11:
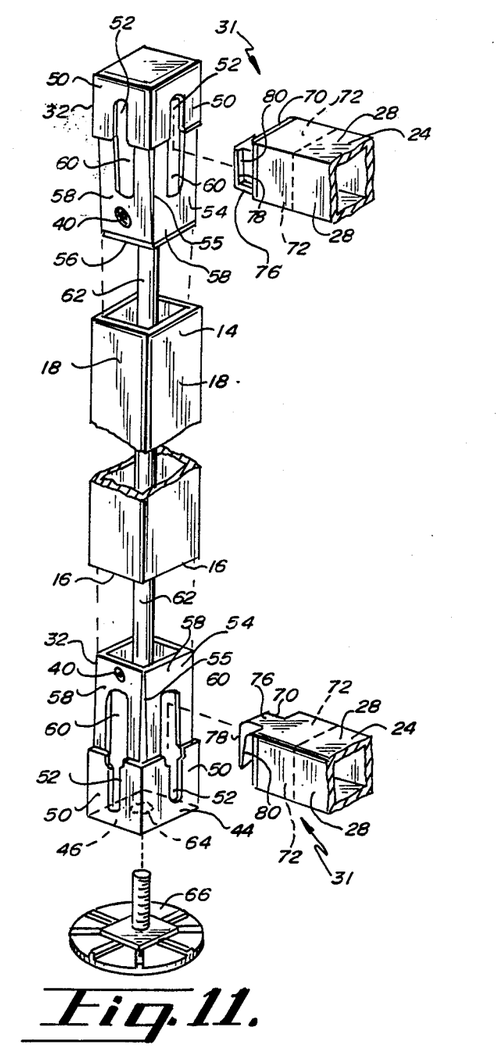
FIG. 11 is an exploded view of the frame members broken away and in alignment for engagement of the interconnected devices and end connectors.
Figure 14:
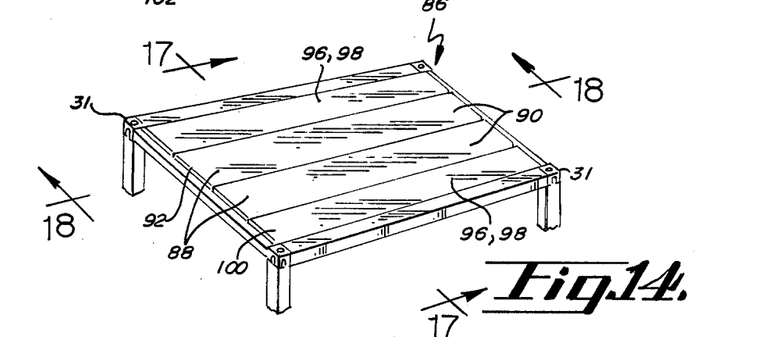
FIG. 14 is a perspective view of the multi-sectioned top of the knockdown structure with the vertical frame members broken away.
Figure 15:
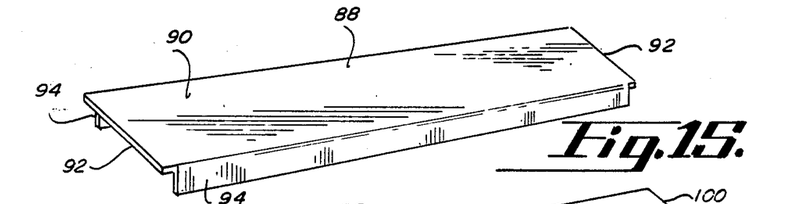
FIG. 15 is a perspective view of a middle section of the multi-sectional top.
Figure 16:
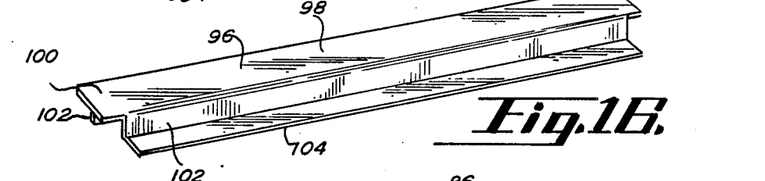
FIG. 16 is perspective view of a side section of the multi-sectional top.
Figure 17:
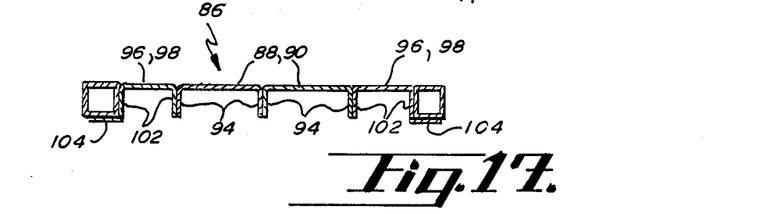
FIG. 17 is a cross-sectional view of the multi-sectional top taken along lines 17—17 of FIG. 14.
Figure 18:
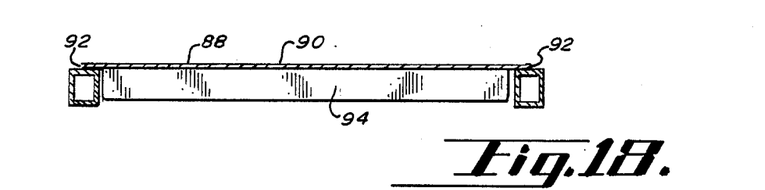
FIG. 18 is a cross-sectional view of the multi-sectioned top taken along lines 18—18 of FIG. 14.

Referring to FIGS. 8–10, the detailed construction of the end connectors 70 may clearly be seen. End connectors 70 are also suitably made of die-cast metal as are the fastening devices 32. End connectors 70 each have a slidably insertable end 72 with longitudinal chamfers 74 to assist in locating the slidable end 72 into one of the ends of the horizontal frame members 24 and affixed therein by any suitable means such as glue or set screws. An outwardly projecting male connector end 76 is provided on each end connector 70 and extends beyond the corresponding horizontal frame member 24. Each male connector end 76 has an enlarged guide section 78 which extends perpendicular from the end of the male connector 76 as shown. Guide section 78 also has inward wedged surfaces 80. By this arrangement, the male connector end 76 is easily guided into a guide slot 60 of a fastening device 32 and moved into tapered rigid engagement with the adjacent and bridging locking slot 52. Male connector end 76 is secured in locking slot 60 by reason of the tapered interference with the wedged surfaces 80 and the inner surfaces of fastening device 32 adjacent locking slot 60 which uniquely provides compensation for any dimensional tolerances.

Referring to FIGS. 1 and 11–13, the assembly of the vertical and horizontal frame members 14 and 24 by means of the fastener and lock assemblies 31 may be seen in further detail. Elastic cord 62 suitably is threaded through vertical frame members 14 and affixed about the inner threaded pedestals 38 through open ends 56 of upper and lower like fastening devices 32. By this arrangement, fastening devices are biased toward each other or inwardly of the respective ends of the vertical frame members 14. When the slidable insertable ends 54 are within the vertical frame members 14, guide slots 16 are appropriately obstructed, covered or closed. Threaded foot 66 may be rotatably inserted into threaded insert 64 of the lower fastening device 32.

Horizontal frame members 24 with end connectors 70 suitably affixed in their ends appropriately may have their male connector ends 76 with their guide sections 78 and wedged surfaces 80 moved into guide slots 60 and thereafter into locking slots 52 for rigid engagement. Thereafter, upper and lower fastening devices 32, which are biased, may be guided into the ends of vertical frame members 14 to thereby close or obstruct guide slots 60 to securely interlock vertical frame members 14 and horizontal members 24 quickly, easily and without the need for tools. It may also be readily appreciated that the individual elements or parts are interchangeable to permit building a table and cabinet of almost any size as well as being readily replaceable should any of the parts become damaged or broken.

Knockdown or disassembly of the structure 10 involves sliding or lifting bias slidably insertable end 54 of the fastening devices 32 out of the ends of the vertical frame members 14 thereby exposing guide slots 60. Thereafter, the male connector ends 76 of the end connectors 70 may be moved from their wedged engagement in the locking slots 52 into the wide guide slots 60 and thereafter pulled away from their respective fastening devices 32.

Referring to FIGS. 14-18, the detailed construction of the multi-sectioned top 86 may clearly be seen. Multi-sectioned top 86 is suitably made of sheet metal and is preferably comprised of two middle sections 88 which are planar and designed to lie side by side. Middle sections 88 each have a planar horizontal support surface 90 with outwardly extending support flanges 92 adapted to rest upon the uppermost opposing horizontal frame members 24. The sides of middle sections 88 each have an elongate depending reinforcement flange 94 which preferably extends the length of the support surface 90. Reinforcement flanges or braces 94 add strength and rigidity to the middle sections 88 of the multi-section top 86. It should be understood that the multi-sectioned top 86 may use one, two or more middle sections depending upon the size of and demands on the particular table and cabinet structure 10 which may be constructed of various dimensions.

Multi-sectioned top 86 also includes two planar side sections 96 suitably made of sheet metal. Each side section 96 includes a horizontal support surface 98 suitably with outwardly extending support flanges 100 for resting upon the opposing horizontal top frame members 24 as the side sections 96 are oriented adjacent the middle sections 88. Side sections 96 similarly have downwardly or depending extending reinforcement flanges or braces 102 which add strength and rigidity to side sections 96 of the multi-sectioned top 86. The downwardly extending flanges 102 of the respective side sections 96 adjacent the opposing horizontal upper frame members 24 have outwardly extending, horizontal frame member reinforcement lips 104 which lie underneath and add support to the adjacent upper horizontal and opposing frame members 24.

In fact, reinforcement lips 104 actually transfer some of the downward weight-bearing forces which may be exerted on the adjacent horizontal frame member 24 to the other upper, horizontal perpendicular frame members 24 by means of the support flanges 100 of the side sections 96 while resting on the other perpendicular and adjacent frame members 24. As such, reinforcement lip 104 compensates for the flexibility of the plastic material of the structure 10 and restrains bending of the upper horizontal frame members 24 to add overall rigidity to the structure 10 and make it capable of supporting considerable weight.

Figure 20:
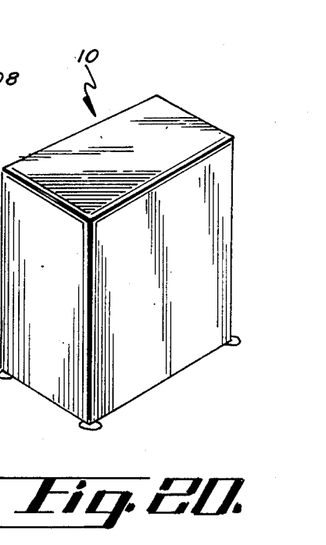
FIG. 20 is a perspective view of a completely assembled knockdown table and cabinet structure of the present invention.

Referring to FIGS. 19 and 20, the attachment of flexible cabinet panels 106 to structure 10 may clearly be seen. Remembering that the outer faces 18 and 28 of vertical and horizontal frame members 14 and 24, respectively, have magnetic tape means or strips 20 and 30, flexible cabinet panels 106 similarly have cooperating magnetic strips 108 which releasably attach to magnetic strips 20 and 30 of vertical and horizontal frame members 14 and 24, respectively, thereby forming a completely assembled table and cabinet 110.

The present invention may be embodied in other specific forms without departing from the spirit or essential attributes thereof, and it is therefore desired that the present embodiment be considered in all respects as illustrative and not restrictive, reference being made to the appended claims rather than the foregoing description to indicate the scope of the invention.

What is claimed:

1. A knockdown table and cabinet structure adapted for ease of assembly and disassembly, comprising:
   (a) a plurality of hollow tubular frame member of substantially square cross section, the frame members including first and second groups;
   (b) a plurality of fastening devices, each fastening device having a slidably insertable end adapted for slidable insertion into the end of a tubular frame member of the first group with a wide guide slot therein and an extending end with a narrow locking slot bridging into the guide slot; a shoulder at the junction of the slidably insertable end and the extending end, said shoulder sized to abut against the end of a tubular frame member and thereby to limit the extending end from ingress into said tubular frame member;
   (c) resilient fastening means for joining together a pair of said fastening devices at opposite ends of a tubular frame member, passing inside said tubular frame member, said resilient fastening means permitting partial egress of said slidably insertable ends from said tubular frame member and resiliently urging said pair of fastening devices inwardly toward abutment of said shoulders against respective ends of said tubular frame member;
   (d) a plurality of end connectors, each connector having a slidably insertable end adapted for insertion and affixing into the end of a tubular frame member AND second group and a projecting male connector end of a dimension sized to be readily insertable into the guide slot but not insertable into the locking slot but movable into the locking slot from the guide slot for rigid and secure locking engagement of the respective frame members together, said locking engagement being aided by the resilient fastening means holding respective pairs of said fastening devices inwardly in said tubular frame members to abut said shoulders against respective ends of said tubular frame members.

2. The structure of claim 1 wherein the ends of the tubular frame members of the first group each have a fastening device slidably insertable therein.

3. The structure of claim 1 wherein the resilient fastening means further comprises an elastic cord.

4. The structure of claim 1, wherein the insertable ends and the extending ends of the fastening devices each have four side faces and further comprise a wide guide slot in each face of each insertable end and a narrow locking slot in each face of each extending end.

5. The structure of claim 1, wherein each of the projecting male connectors comprise an enlarged guide section with wedged surfaces for tapered frictional engagement with the extending section of the fastening device adjacent the locking slot.

6. The structure of claim 1, wherein the ends of the tubular frame members of the second group each have an end connector inserted and affixed therein.

7. The structure of claim 1, wherein the tubular frame members of the first group are vertically oriented and the tubular frame members of the second group are horizontally oriented.

8. The structure of claim 1, wherein the fastening devices each have an end face with a central aperture therein, and further comprising a threaded insert fitted into the aperture, and a threaded leveling foot rotatably insertable into the insert.

9. The structure of claim 1, further comprising means for magnetically attaching panels to the frame members.

10. A top for a knockdown table and cabinet structure wherein the structures have a first pair of opposing horizontal and parallel upper frame members and a second pair of opposing horizontal and parallel upper frame members which are planar with and perpendicular to the first pair and the end of the respective pairs are interconnected, comprising:
   (a) a planar middle section with opposing outwardly extending support flanges which are adapted to rest upon the opposing frame members of the first pair and having an elongate depending reinforcement flange extending parallel to the members of the second pair; and
   (b) two planar side sections each with opposing outwardly extending support flanges which are adapted to rest upon the opposing frame members of the first pair and having a depending reinforcement flange extending parallel and adjacent to one of the frame members of the second pair and an outwardly extending member reinforcement lip which lies under the adjacent member of the second group to add rigidity and support to the structure.

11. The top of claim 10, wherein each section has two elongate depending reinforcement flanges.

12. The top of claim 10, wherein the sections are made of sheet metal.

13. A knockdown table and cabinet structure adapted for ease of assembly and disassembly, comprising:
   (a) a plurality of hollow tubular frame members of substantially square cross section, the frame members including first vertical and second horizontal groups;
   (b) a plurality of fastening devices, each fastening device having a slidably insertable end with four faces adapted for slidable insertion into the end of a tubular frame member of the first group with a wide guide slot in each insertable end face, an extending end with four faces with a narrow locking slot in each extending end face bridging into the guide slot of the adjacent insertable end face, one fastening device for each end the frame members of the first vertical group and being biased inwardly of the tubular frame end;
   (c) a plurality of end connectors, one for each end of the second horizontal group, each having a slidably insertable end adapted for insertion and affixing into the ends of the horizontal tubular frame members and further having a projecting male connector end with an enlarged guide section with wedged surfaces of a dimension sized to be readily insertable into the guide slot but not insertable into the locking slot but movable into the locking slot from the guide slot and frictionally held within the locking slot after which the slidably insertable end of the fastening device may be inserted into the end of the first tubular frame member for obstructing the guide slot and for locking engagement of the respective frame members together;
   (d) a multi-sectioned top for the topmost horizontal frame members once releasably interconnected to form a rectangle, comprising:
      (i) a planar middle section with opposing outwardly extending support flanges which are adapted to rest upon the second opposing horizontal uppermost frame members having an elongate depending reinforcement flange extending parallel to the other opposing uppermost horizontal members; and
      (ii) two planar side sections each with opposing outwardly extending support flanges which are adapted to rest upon the second opposing horizontal uppermost frame members and further having a depending reinforcement flange extending parallel and adjacent to one of the other opposing uppermost horizontal frame members and an outwardly extending member reinforcement lip which slides under the adjacent uppermost horizontal member to add rigidity and support to the structure.

* * * * *